UNITED STATES PATENT OFFICE.

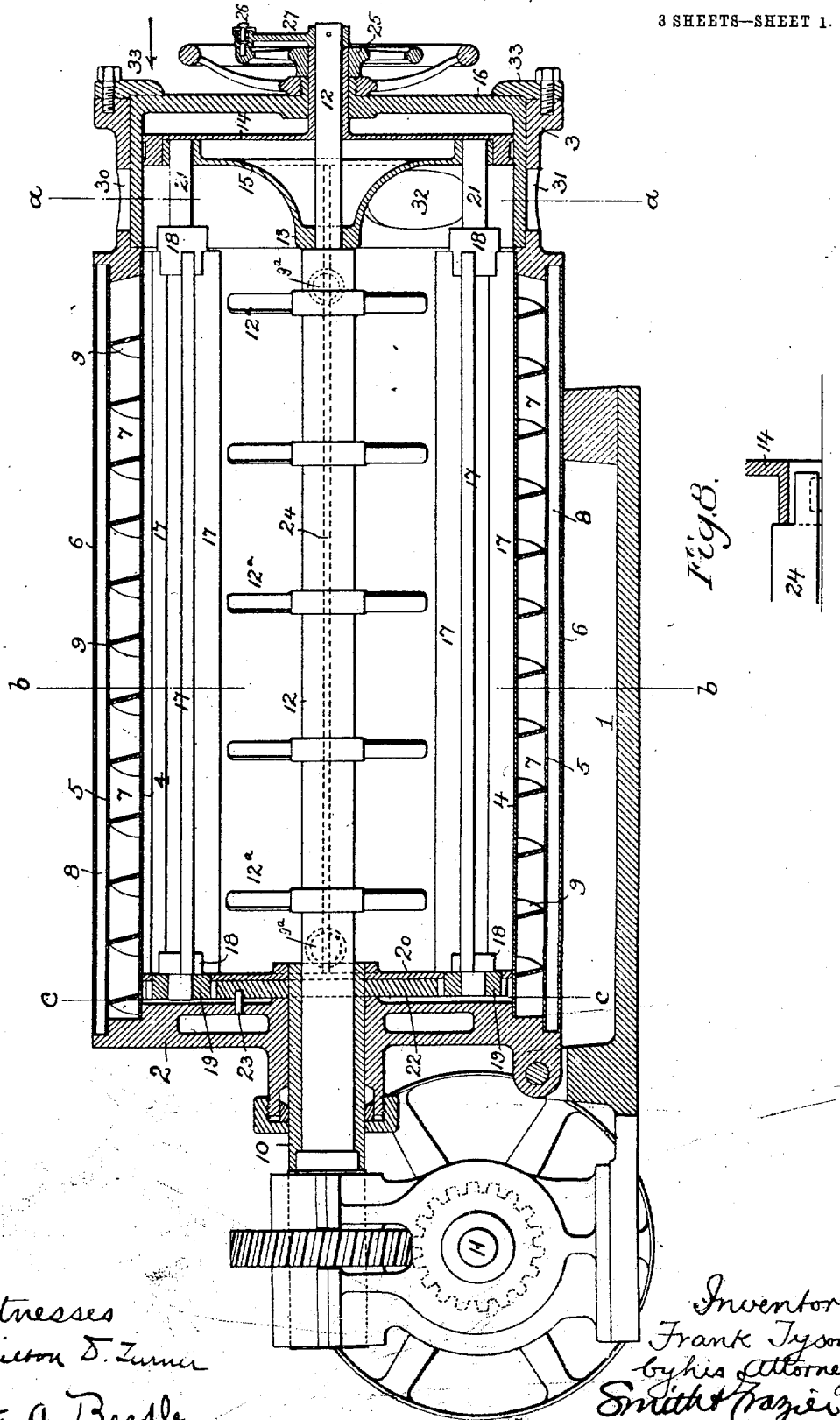

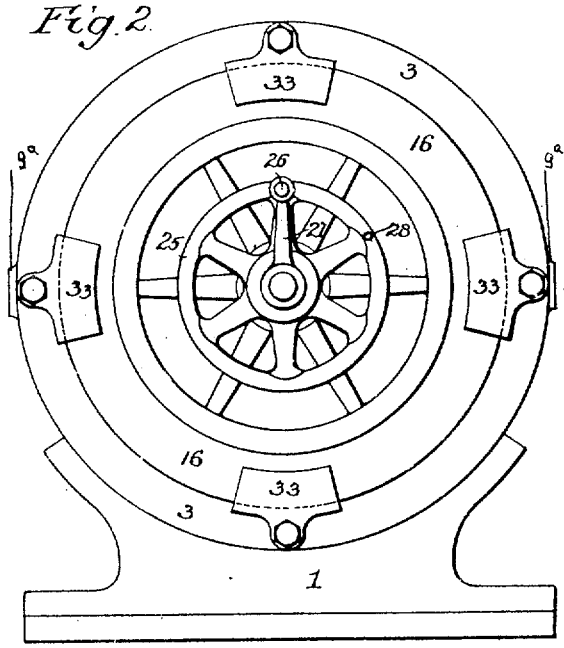
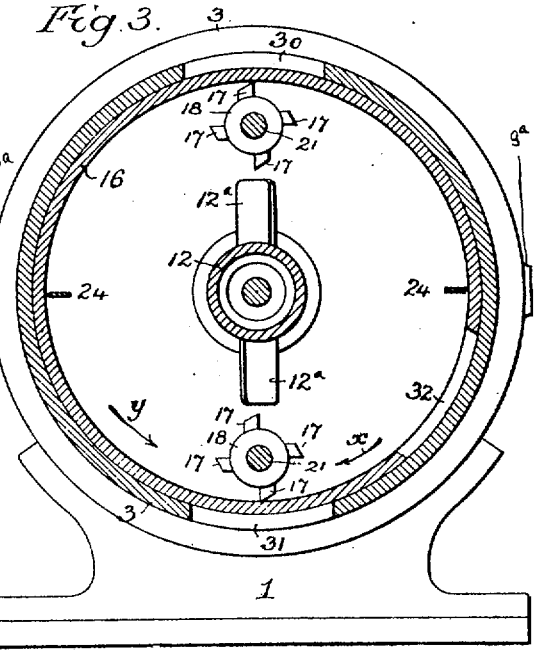
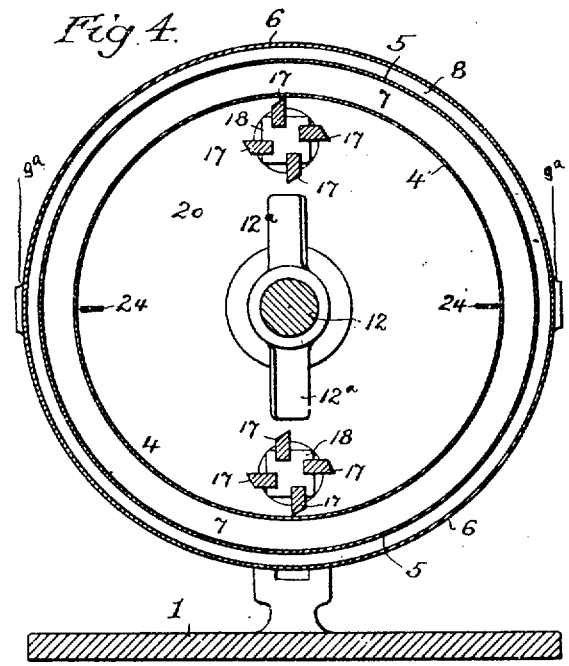
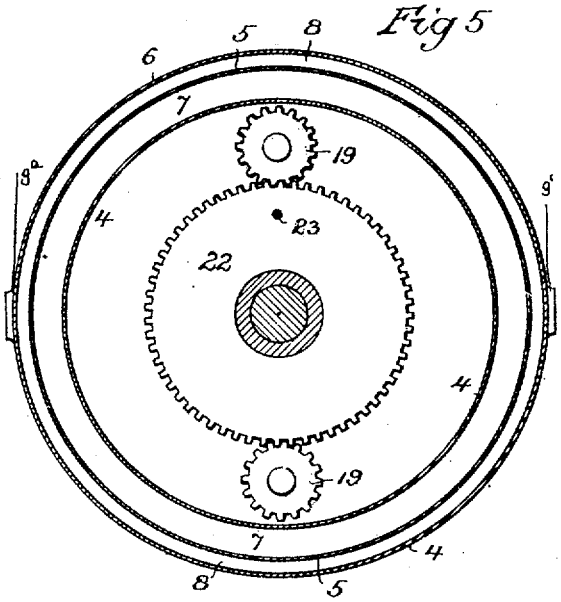

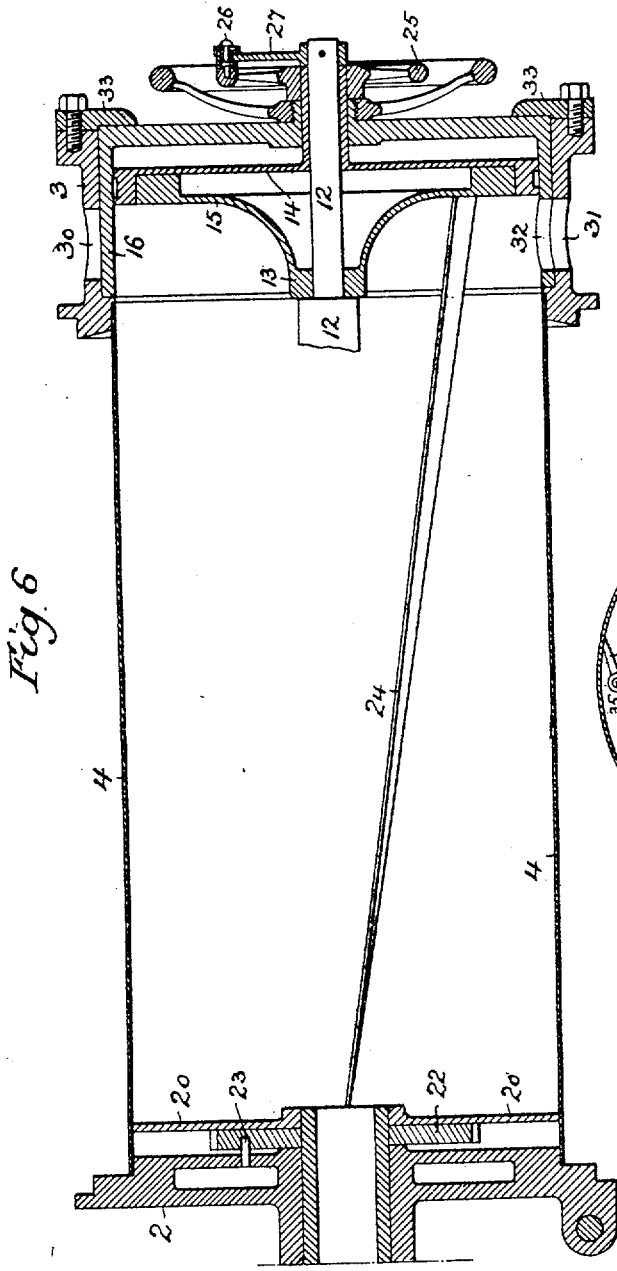
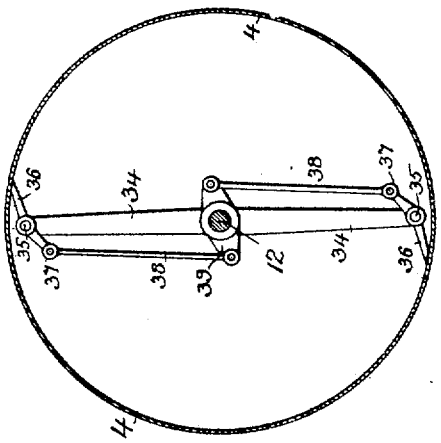

FRANK TYSON, OF CANTON, OHIO.

ICE-CREAM FREEZER.

No. 855,364.   Specification of Letters Patent.   Patented May 28, 1907.

Application filed May 14, 1906. Serial No. 316,805.

*To all whom it may concern:*

Be it known that I, FRANK TYSON, a citizen of the United States, residing in Canton, Ohio, have invented certain Improvements in Ice-Cream Freezers, of which the following is a specification.

My invention relates to that class of ice-cream freezers which are susceptible of being operated continuously, if desired, that is to say, the operation of the freezer does not have to be arrested for the supply of the cream thereto or the discharge of the frozen cream therefrom.

The objects of my invention are to render such a machine simple and efficient in its operation, to provide for the feeding of the cream to the freezing vessel and the discharge of the frozen cream from the same at one and the same end, to remove the frozen cream from the walls of the freezing vessel without the use of a continuously acting scraper or scrapers, and to so construct that element of the machine which effects the discharge of the frozen cream that it will perform such duty only when required, being at other times inoperative for such purpose.

In the accompanying drawings:—Figure 1 is a longitudinal sectional view of an ice cream freezer constructed in accordance with my invention; Fig. 2 is an end view of the same looking in the direction of the arrow, Fig. 1; Fig. 3 is a transverse section on the line $a$—$a$, Fig. 1; Fig. 4 is a transverse section on the line $b$—$b$, Fig. 1; Fig. 5 is a transverse section on the line $c$—$c$, Fig. 1; Fig. 6 is a longitudinal section illustrating one of the features of my invention; Fig. 7 is a transverse section illustrating a modification of one of the features of the invention, and Fig. 8 is an enlarged view showing one of the features of construction of the machine.

In the drawing, 1 represents a suitable bed or base plate for supporting the freezer and the mechanism for driving the operative parts of the same. In the present instance, the fixed structure of the freezer comprises opposite heads 2 and 3, which are connected by three metal cylinders 4, 5, and 6, the innermost cylinder 4 constituting the freezing vessel, the intermediate cylinder 5 inclosing the brine chamber 7 which surrounds said freezing vessel, and the outer cylinder 6 inclosing an annular chamber 8 which surrounds the brine chamber and which may be packed with any suitable non-conducting material, or may simply constitute a dead air chamber, as preferred.

The brine chamber contains a spirally disposed flange 9 of a width equal to the space between the cylinders 4 and 5, this flange being soldered or otherwise secured to either of the cylinders at appropriate intervals, so that it occupies a fixed position and serves to form a spiral passage for the brine around the freezing vessel, it being understood that the brine inlet pipe is located at one end of this passage and the outlet pipe at the opposite end of the same as shown by dotted lines at $9^a$ in Fig. 1.

Rotating freely within a suitably packed bearing within the head 2 of the machine is a tubular shaft 10, which is rotated by gearing from a transverse shaft 11, adapted to suitable bearings at the end of the bed or base-plate 1, spirally toothed gearing being shown in the present instance as a driving connection. Secured to and projecting from the tubular shaft 10 is a shaft 12, which extends from end to end of the freezing vessel, and carries a series of beaters $12^a$, the reduced end of this shaft 12 being mounted in the hub 13 of a two-part disk 14—15, which can rotate freely in a cup-shaped valve 16, the latter being susceptible of turning movement in the head 3 of the fixed structure of the machine for a purpose hereinafter described, and being retained in position longitudinally by means of cleats 33 secured to the head 3.

The machine is provided with a pair of combined rotary beaters and scrapers, each consisting of a series of longitudinal blades 17, four in the present instance, carried by opposite heads 18, the heads at one end of the machine having pinions 19, which are mounted so as to rotate in a disk 20 near one end of the freezing chamber, and the opposite heads having spindles 21 which can turn in bearings in the inner portion 15 of the duplex disk at the opposite end of said freezing chamber. The disk 20 forms a reasonably snug fit with the inner surface of the vessel 4, so as to prevent leakage of cream beyond the disk, and in the chamber between said disk 20 and the head 2 of the machine are contained the pinions 19 and a spur wheel 22, which is mounted upon the tubular shaft 10, but is held from rotation therewith by engagement with a pin 23 projecting inwardly from the head 2, or by some other equivalent retaining device. As a consequence of this construction the combined beaters and scrapers 17 will not only be caused to rotate around the axis of the shaft 12 but will each be caused to rotate at a high rate of speed around its own axis, and instead of exerting a continuous scraping action upon the frozen cream adhering to the walls of the freezing vessel 4, the blades 17 will act in rapid succession, the gearing being so devised that as the scrapers are carried around the axis of the shaft 12, the blades 17 will not act successively at the same points on the inner surface of the freezing vessel 4 but at points slightly in advance of, or slightly behind, those touched on the former rotation, whereby all portions of the inner surface of the freezing vessel will, within a certain number of rotations of the shaft 12, be acted upon by blades 17, and the removal of the frozen cream from the entire inner surface of the freezing vessel will thus be effected, a longer time being afforded between successive actions of the scrapers upon any particular portion of the inner surface of the freezing vessel than if said scrapers were in continuous contact with said inner surface and therefore removed the frozen cream therefrom on each half rotation of the shaft 12. The rotating blades 17 of the scrapers also act in the nature of beaters, and provide for the more thorough agitation of the cream than is effected by an ordinary scraper, the result being a smoother frozen product.

The rotating disk 20 has secured to it one end of each of a pair of blades 24, the opposite end of each of these blades having a portion entering an opening in the outer member 14 of the double disk at the delivery end of the freezing chamber, but free from connection therewith, and hence capable of moving longitudinally in respect thereto, (see Fig. 8). Normally these blades occupy a position parallel with the longitudinal axis of the shaft 12, as shown by dotted lines in Fig. 1 and by full lines in Figs. 3 and 4, and hence exert nothing more than a stirring or agitating effect upon the mass of cream in the freezing chamber, the outer faces of the blades being, by preference, free from contact with the inner face of the vessel 4, so that they will not act as scrapers. By imparting a partial turn to the member 14 of the double disk these blades can be transformed from straight or parallel blades, such as shown in Fig. 1, into spirally disposed blades, such as shown in Fig. 6, and they then have a tendency to move the frozen cream from the end 2 of the machine toward the end 3 of the same, or in other words, act as discharging blades for effecting delivery of the frozen cream from the freezing chamber. The fact that the blades 24 are not longitudinally confined to the disk 14 prevents the latter from exerting any restraint upon this change of position of the blades.

During the freezing operation the two members of the double disk 14 and 15 rotate together and with the shaft 12, a wheel 25, which is secured to the hub of the disk member 14, being locked by means of a spring bolt 26 to an arm 27, which is secured to the reduced end of the shaft 12, as shown in Fig. 1, but if the bolt 26 is temporarily withdrawn from engagement with the wheel 25 and the latter wheel is held against rotation until the arm 27 has made a partial turn, and the spring bolt 26 has entered another opening 28 in said wheel, there will be movement of the disk 20 relatively to the outer member 14 of the double disk and a consequent shift of the blades 24 from the position shown in Fig. 1 to that shown in Fig. 6, reverse movement of the wheel 25 in respect to the arm 27 effecting a restoration of the blades 24 to their normal position.

The head 3 of the machine has a port 30 for the introduction of the cream into the freezing chamber, and a port 31 for the discharge of the frozen cream therefrom, and the cup-shaped valve 14 has a port 32, as shown in Figs. 1, 3 and 6, or it may, if desired, have two of these ports.

When the valve is in the position shown in Figs. 1 and 3 both of the ports 30 and 31 are closed, this being the position of the valve when the freezing operation is being conducted within the freezing chamber. By turning the valve in the direction of the arrow $x$, (Fig. 3) however, the port 32 of the valve may be brought into register with the port 31 of the head 3, as shown in Fig. 6, in order to permit discharge of the frozen cream from the freezing chamber, and by turning said valve in the direction of the arrow $y$, (Fig. 3) the port 32 may be brought into register with the port 30, for the purpose of permitting introduction of a fresh supply of cream into the freezing chamber. When two ports are used they should be so disposed that both of them cannot be open at the same time.

In the modification of my invention shown in Fig. 7, the shaft 12 has oppositely projecting arms 34, in the outer ends of which are mounted rock shafts 35, each carrying a scraping blade 36, and each having an arm 37, one of these being connected by a rod 38 to one arm, and the other to the opposite arm of a two-armed lever 39, mounted so as to be free to rock on the shaft 12. The blades 36 are thus connected for simultaneous and corresponding movement, and the weight of the cream upon the blade which, for the time being, occupies the lower portion of the vessel 4, tends not only to press said blade against the inner face of the vessel 4, but also imparts like movement to the upper blade, and thus causes a scraping action upon the upper portion, as well as upon the lower portion of said vessel.

By turning the valve 16, so as to bring its opening 32 into line with the inlet opening 30, a clear view of the interior of the freezing chamber is obtained, and the condition of the contents of said chamber can be noted.

While I have shown my improved freezer as provided with two ejector blades 24, and while I prefer this construction, it will be evident that a single blade could be used, if desired, or more than two blades might be employed, and it is also immaterial to the broader embodiment of my invention whether the beating and stirring devices or the freezing vessel be the element which rotates about the axis of the shaft 12, the rotation of the beating and stirring devices, however, being the preferable construction.

I claim:—

1. A rotary horizontal ice cream freezer, having, at the same end, inlet and outlet, both opening directly into the freezing chamber, a valve controlling said outlet, and means located at the said end for operating said valve whereby the condition of the contents of the latter may be observed through said inlet opening and the cream supply and delivery of frozen cream controlled by the operator at the said end of the machine without changing his position.

2. A rotary ice cream freezer having both inlet and discharge ports at the same end, and a single valve controlling both of said ports.

3. A rotary ice cream freezer having both inlet and discharge ports at the same end, and a single valve having but one port and controlling both the inlet and discharge ports of the freezer.

4. A rotary ice cream freezer comprising a cylindrical freezing vessel with inlet and discharge ports at the same end, and a valve closing said end of the freezing vessel and controlling said inlet and discharge ports.

5. A rotary ice cream freezer having a cylindrical freezing vessel, and a blade therein adjustable either into line with the axis of the vessel or to a spiral position, so as to serve as an ejector.

6. A rotary ice cream freezer having a cylindrical freezing vessel, an ejector plate therein, and means for imparting to one end of said plate a partial turn around the axis of the freezing vessel without corresponding movement of the other end of the plate.

7. A rotary ice cream freezer having a cylindrical freezing vessel, an ejector blade therein, fixedly mounted at one end and a carrier engaging the other end of said blade, and mounted so as to be susceptible of a partial turn around the axis of the freezing vessel.

8. A rotary ice cream freezer having a cylindrical freezing vessel, an ejector blade therein fixedly mounted at one end, and a carrier loosely engaging the other end of said blade, and mounted so as to be susceptible of a partial turn around the axis of the freezing vessel.

9. A rotary ice cream freezer comprising a cylindrical vessel with inlet and discharge ports at one end, a controlling valve for said ports fitting said end of the freezing vessel, a carrier mounted so as to be susceptible of a partial turn in said valve, and an ejector blade engaging said carrier.

10. A rotary ice cream freezer having a cylindrical freezing vessel, an ejector blade therein free to move at one end independent of the other end, and a carrier engaging said independently movable end of the blade and having an axial extension projecting to the outside of the freezing vessel, whereby it may be turned.

11. A rotary ice cream freezer having oppositely disposed and movably mounted scrapers, and means connecting a movable portion of one scraper to a corresponding movable portion of the other scraper, whereby movement of one scraper independently of the other is prevented, and joint, simultaneous and similar action of the scrapers is effected.

12. A rotary ice cream freezer having a cylindrical freezing vessel, a central shaft having projecting beater arms, set diagonally in respect to the axial line of the shaft, a combined beater and scraper mounted adjacent to the inner wall of the freezing vessel, and means for rotating the central shaft and the combined beater and scraper independently but in the same direction about the axis of the freezing vessel.

13. A rotary ice cream freezer having a cylindrical freezing vessel, a central shaft having projecting beater arms disposed diagonally in respect to the axial line of the shaft, a combined beater and scraper mounted adjacent to the inner wall of the freezing vessel, means for rotating the central shaft and the combined beater and scraper independently but in the same direction about the axis of the freezing vessel, and means for rotating said combined beater and scraper about its own axis independently of its rotation about the common axis.

14. A horizontal ice cream freezer having a stationary freezing vessel, and rotating scraping and agitating mechanism therein, said freezing vessel having inlet and discharge openings at the same end communicating directly with the freezing chamber, a valve controlling said outlet and means located at said end of the machine for operating the said valve, whereby the condition of the contents of the chamber may be observed through said inlet opening and the cream supply and delivery of the frozen cream controlled by the operator at said end of the machine without changing his position.

15. A rotary ice cream freezer comprising a cylindrical freezing vessel, a rotary beater and scraper mounted adjacent to the inner wall of said vessel, an ejector blade, and a two-part disk, one part providing a bearing for the beater and scraper and the other for the ejector blade, said two parts of the disk being mounted so as to have movement relatively to one another.

16. A rotary horizontal ice cream freezer having both inlet and discharge openings at the same end communicating directly with the freezing chamber, said discharge opening delivering in a substantially vertical direction, a valve controlling said outlet and means located at said end of the machine for operating the said valve, whereby the condition of the contents of the chamber may be observed through said inlet opening and the cream supply and delivery of the frozen cream controlled by the operator at said end of the machine without changing his position.

17. A rotary ice cream freezer having a cylindrical freezing vessel, an ejector blade therein, a carrier for one end of said blade mounted so as to be susceptible of a partial turn around the axis of the freezer, and external devices whereby the adjustment of said carrier can be effected.

18. A rotary ice cream freezer having a cylindrical freezing vessel, an ejector blade therein, a carrier for one end of said blade mounted so as to be susceptible of a partial turn around the axis of the freezer, external devices whereby the adjustment of said carrier can be effected, and means for locking said devices in either position of adjustment.

In testimony whereof, I have signed my name to this specification, in the presence of two subscribing witnesses.

FRANK TYSON.

Witnesses:
   ISAAC H. TAYLOR,
   Z. W. DAVIS.

Correction in Letters Patent No. 855,364.

It is hereby certified that in Letters Patent No. 855,364, granted May 28, 1907, upon the application of Frank Tyson, of Canton, Ohio, for an improvement in "Ice-Cream Freezers," an error appears in the printed specification requiring correction as follows: Page 3, line 26, after the word "valve" insert a semicolon; and that the said Letters Patent should be read with this correction therein that the same may conform to the record of the case in the Patent Office.

Signed and sealed this 12th day of January, A. D., 1915.

[SEAL.]

R. F. WHITEHEAD,
*Acting Commissioner of Patents.*